Jan. 11, 1927.
J. A. ZUBLIN
1,613,862
PACKING STRUCTURE
Filed Oct. 12, 1922  2 Sheets-Sheet 1
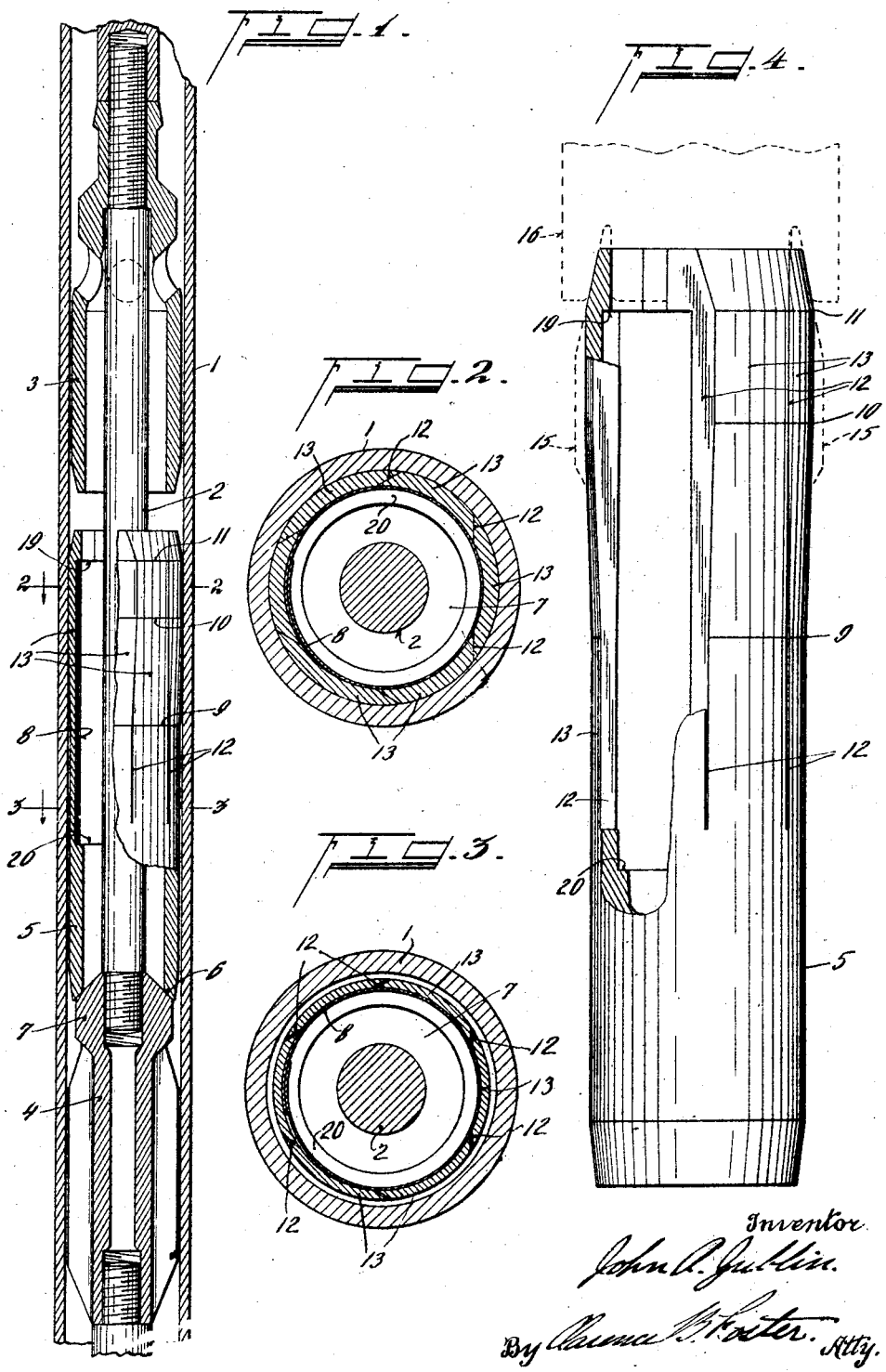

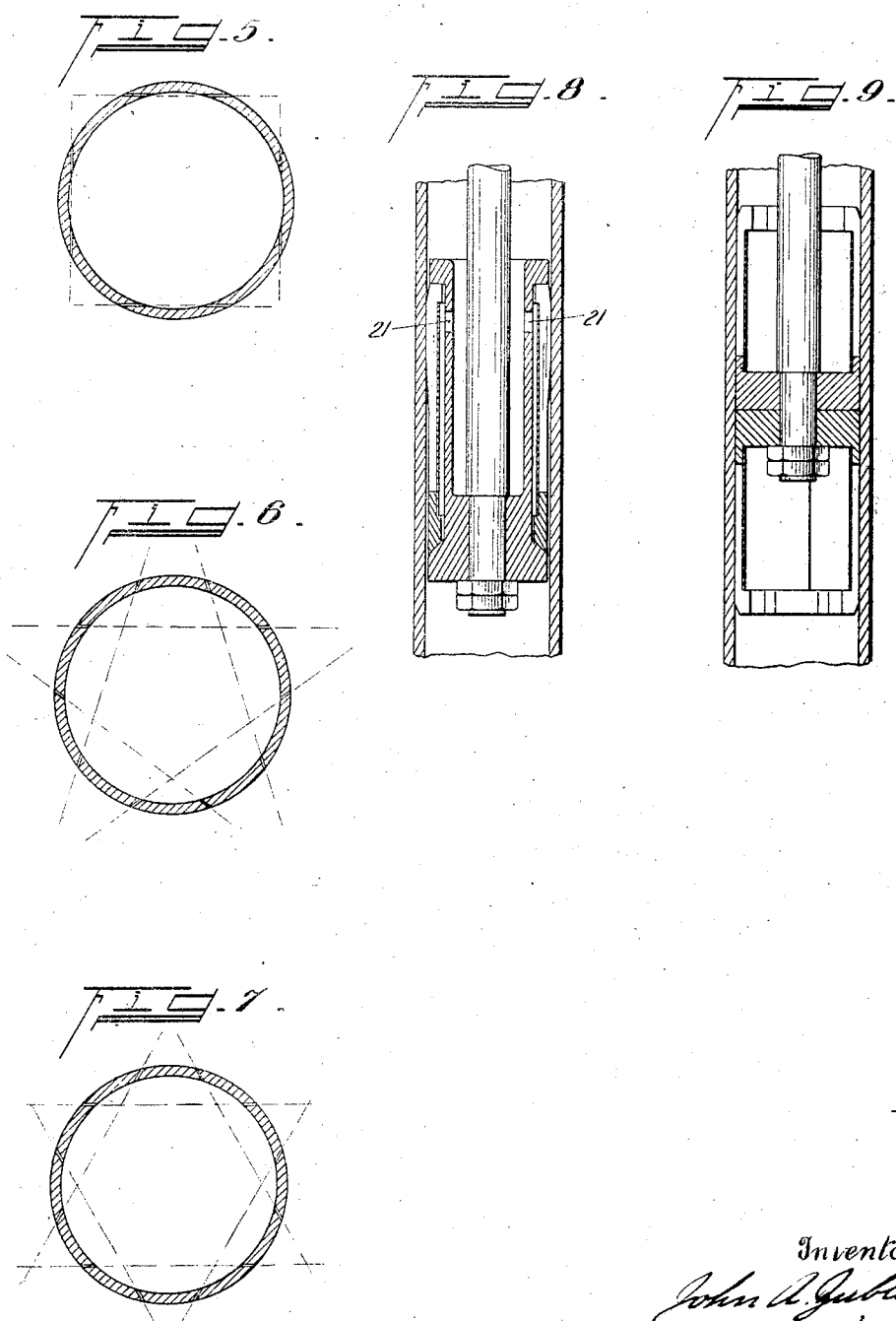

Patented Jan. 11, 1927.

1,613,862

UNITED STATES PATENT OFFICE.

JOHN A. ZUBLIN, OF LOS ANGELES, CALIFORNIA.

PACKING STRUCTURE.

Application filed October 12, 1922. Serial No. 594,193.

This invention relates to packing structures, and is particularly directed to an improved form of structure especially adaptable for use as a piston packing.

It is an object of the invention to provide a tubular packing structure which is longitudinally slit to form a series of coengaging sections and with the slits so disposed as to remain closed during an expansion or contraction of the sections.

Another object is to provide an expansible member which engages the inner surfaces of the several sections and is exposed to the pressure packed against whereby said pressure acts to expand said member and the sections.

A further object resides in the provision of an expansible and contractable metallic packing comprising a series of coengaging sections capable of an expanding or collapsing movement without separation.

Another object is to provide a metallic packing structure having a slit packing portion in which all of said slits remain closed during an expansion or contraction thereof.

Various other objects and advantages will be more fully apparent from the following description of the accompanying drawings, which form a part of this disclosure, and which illustrate a preferred form of embodiment of the invention.

Of the drawings:

Figure 1 is a longitudinal section through a pump containing my improved packing structure.

Figure 2 is an enlarged plan section on line 2—2 of Figure 1.

Figure 3 is a similar plan section on line 3—3 of Figure 1.

Figure 4 is an enlarged detail elevation, partly broken away, of the packing member and illustrating in dotted lines a preferred manner of manufacture.

Figures 5, 6 and 7 are semi-diagrammatic sections illustrating different manners of slitting the packing member.

Figure 8 is a longitudinal section through a piston and cylinder illustrating a modified application of the packing structure.

Figure 9 is a section similar to Figure 8, showing a further modified application of my improved packing structure.

Referring particularly to Figures 1 to 4, the packing structure is shown associated with a fluid pump in which, 1 designates the pump cylinder or tubing, the pump piston comprising a rod 2 having connected therewith two relatively spaced guide members 3 and 4 which serve as abutments limiting an initial independent movement of the rod, and which subsequently translate the packing structure. The packing structure includes a tubular member 5 having its lower end formed to provide a valve seat 6 for cooperation with a valve element 7 on the guide member 4.

In the operation of this type of pump, an initial down stroke of the rod first effects an opening of the valve 7, the upper abutment then contacting the tubular packing member 5 and translating it to the end of the downward stroke. Upon the upstroke the initial movement of the rod effects a closing of the valve 7 and the tubular packing member 5 is then translated in a pumping stroke.

This type of pump forms the subject matter of my co-pending application filed on even date herewith and entitled "Well pump," Serial No. 614,776, filed January 23, 1923, to which reference may be had for a more detailed description of features not strictly pertinent to the invention claimed herein.

The packing structure to which the present invention relates, comprises the tubular packing member 5, and an inner flexible sealing member 8, both cooperating to provide a packing capable of expanding or contracting and at the same time capable of maintaining a full unbroken packing surface which engages the cylinder or tubing walls with a pressure varying with the pressure of the fluid packed against.

The member 5, from its lower end upwardly to a point 9, is of a reduced diameter adapting it for insertion into rough or undersize tubing, and gradually increases to full normal gage providing a packing surface extending from a point 10 to a point 11, the opposite ends of the member 5 being beveled to facilitate its insertion into the tubing, and to permit it to more easily slide over rough areas therein.

The tubular packing member 5 is slit downwardly as at 12, with the slits extending from its top edge past the packing surface and to a point considerably below the point 9, and disposed at circularly spaced intervals to form a series of yielding blades or sections 13.

As clearly shown in Figures 2 and 3, the member 5 is slit to provide six of such blades or sections with each slit transversely angled relative to its radial disposition, that is, the transverse plane of each slit is out of registering alignment with the axis of the member 5. In other words, the transverse plane of each slit is to one side of said axis as distinguished from a plane which intersects said axis.

It will be noted that the successive slits are reversely angled and that each longitudinal edge of the blades or sections corresponds to that of the coengaging edge of the adjacent section so that during an expanding or collapsing of the several blades or sections these longitudinal edges will slide upon each other without causing a separation of the slits.

As illustrated in Figures 5 to 7, this general method of slitting the packing member may be utilized to form a greater number of such blades or sections, either of these specific forms providing alternate sections having opposite longitudinal edges transversely converging outwardly, and intermediate sections having opposite longitudinal edges transversely disposed to correspond to the longitudinal edges of the adjacent sections.

One method of manufacturing a packing member as above described, consists of first machining the tubular member excepting in the region of the packing surface, as indicated in dotted lines 15 in Figure 4, then slitting said member in the manner heretofore described, preferably by sawing; then engaging the upper beveled end of said member with a suitable device or die 16 which will compress the several blades or sections 13 together to close the several saw slots throughout the length of the packing surface, and subsequently turning the packing surface between the points 10 and 11 to normal gage.

When made in this manner, the lower portions of the slits below the packing surface will not be entirely closed, therefore I provide a means for positively sealing the several slits. Such means consists of a relatively thin flexible sleeve 8 which engages the inner surfaces of the several blades or sections between an upper internal shoulder 19 and a lower internal shoulder 20 which is located below the lower ends of the several slits. This sleeve is formed of a flat piece of sheet metal rolled upon itself with its free edges overlapping, as shown in Figures 2 and 3, whereby said sleeve is capable of expanding or contracting under the influence of the pressure within the sleeve, which pressure is the pressure packed against.

In Figure 8, a packing structure similar in detail to that above described, is shown applied within a packing groove in a piston with the pressure packed against being effective upon the flexible sleeve through ports 21 in the piston wall.

In Figure 9, I have shown a packing structure combining opposed packing members both of which are integral with the piston.

In the preferred form of structure the several slits are circularly arranged so that the cross-sectional areas of the several blades are approximately equal, whereby the flexibility of the several blades will be substantially the same.

Each of the above described structures provides a packing which may be made of metal or other noncompressible material and which is slit in a manner to permit the packing to be expanded or contracted without separation of the several sections whereby the several slits are maintained closed throughout the area of the packing surface.

While the form of structure herein disclosed is well adapted to fulfill all of the objects primarily stated, it is to be understood that I do not wish to limit the invention to the specific embodiment herein illustrated and described, for it is susceptible of embodiment in various other forms, all coming within the scope of the following claims.

I claim:

1. A packing structure comprising a tubular member longitudinally slit from one end, with the slits transversely angled and circularly spaced to provide a series of coengaging sections, the bore of said member being enlarged to provide an internal shoulder near the free ends of the sections and an opposed internal shoulder beyond the slits, and an expansible sleeve engaging the inner surfaces of the sections and positioned between said shoulders.

2. A packing structure comprising: a tubular member longitudinally slit from one end so as to form blades having non-radial edges; and a resiliently expansible sleeve engaging the inner surfaces of said blades, said sleeve having overlapping free end portions.

3. In combination: a tubular packer member having an axial passage; blades formed on one end of said member, said blades having non-radial co-engaging faces; and a flexible member disposed in an enlarged portion of said axial bore.

4. In combination: a tubular packer member having an axial passage; blades formed on one end of said member, said blades having non-radial co-engaging faces; and a flexible member disposed in an enlarged portion of said axial bore, said flexible member being a continuous member arranged for circumferential expansion.

5. A packing structure comprising: a tubular member longitudinally split from one end so as to form blades having non-radial edges, said tubular member having its ends beveled on the outer surface.

6. A packing structure comprising: a tubular member having a uniform outer diameter through part of its length, and a lower portion adjacent the portion having a uniform diameter, of smaller diameter than the latter portion, said tubular member being longitudinally split through the portion having a uniform diameter into the portion having the smaller diameter in a manner forming contacting blades capable of expanding and contracting movement without complete separation of their contacting edges.

7. A packing structure comprising: a tubular member having a uniform outer diameter through part of its length, a lower portion adjacent the portion having a uniform diameter, of smaller diameter than the latter portion, said tubular member being longitudinally split through the portion having a uniform diameter into the portion having the smaller diameter in a manner forming contacting blades capable of expanding and contracting movement without complete separation of their contacting edges; and a resiliently expansive sleeve contacting with the inner surface of said blades, said resiliently expansive sleeve cooperating with said tubular member in a manner to prevent a leakage through said longitudinal split.

8. A packing structure comprising: a tubular member having a plurality of non-radial longitudinal slits, the adjacent slits being oppositely angled.

9. A packing structure comprising: a tubular member having a plurality of non-radial longitudinal slits, the adjacent slits being oppositely angled; and a resiliently expansive sleeve contacting with the inner surface of said tubular member and closing openings formed by said slits.

Signed at Los Angeles, California, this 6th day of October, 1922.

JOHN A. ZUBLIN.